(12) United States Patent
Urabe et al.

(10) Patent No.: US 8,660,688 B2
(45) Date of Patent: Feb. 25, 2014

(54) AUTOMATIC WORKING DEVICE

(75) Inventors: Katsunori Urabe, Kitakyushu (JP);
 Keigo Ishibashi, Kitakyushu (JP);
 Takashi Shiino, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 117 days.

(21) Appl. No.: 13/349,563

(22) Filed: Jan. 13, 2012

(65) Prior Publication Data

US 2012/0228892 A1  Sep. 13, 2012

(30) Foreign Application Priority Data

Mar. 8, 2011 (JP) ................................. 2011-050645

(51) Int. Cl.
 *G06F 7/00* (2006.01)
 *G06F 19/00* (2011.01)
 *G05B 19/00* (2006.01)

(52) U.S. Cl.
 USPC ............ 700/228; 700/245; 700/213; 700/258

(58) Field of Classification Search
 None
 See application file for complete search history.

(56) References Cited

U.S. PATENT DOCUMENTS

| | | | |
|---|---|---|---|
| 4,991,706 A | 2/1991 | Kitamura | |
| 5,945,798 A | 8/1999 | Stagnitto et al. | |
| 2002/0065571 A1 | 5/2002 | Kamiguchi et al. | |
| 2007/0282485 A1 * | 12/2007 | Nagatsuka et al. | 700/245 |

FOREIGN PATENT DOCUMENTS

| | | |
|---|---|---|
| GB | 2154351 | 9/1985 |
| JP | 59-73287 | 4/1984 |
| JP | 60-085856 | 5/1985 |
| JP | 07-8469 B2 | 4/1987 |
| JP | 63-5411 | 1/1988 |
| JP | 04-30927 | 2/1992 |
| JP | 10-015865 | 1/1998 |
| JP | 10-217175 | 8/1998 |
| JP | 2008-254900 | 10/2008 |
| JP | 2009-291873 | 12/2009 |
| JP | 2009291873 A * | 12/2009 |

OTHER PUBLICATIONS

Japanese Office Action for corresponding JP Application No. 2011-050645, May 7, 2013.
Extended European Search Report for corresponding EP Application No. 12150215.7-1807, Apr. 3, 2013.

* cited by examiner

*Primary Examiner* — Yolanda Cumbess
(74) *Attorney, Agent, or Firm* — Ditthavong Mori & Steiner, P.C.

(57) ABSTRACT

An automatic working device according to an aspect of an embodiment includes a robot hand and a determining unit. The robot hand grips a target workpiece. The determining unit determines the type of the workpiece on the basis of a gripping operation for making the robot hand grip a gripped piece that indicates the type of the workpiece provided in a supply vessel that supplies the workpiece to the robot hand.

20 Claims, 11 Drawing Sheets

AUTOMATIC WORKING DEVICE

CROSS-REFERENCE TO RELATED APPLICATION

This application is based upon and claims the benefit of priority of the prior Japanese Patent Application No. 2011-050645, filed on Mar. 8, 2011, the entire contents of which are incorporated herein by reference.

FIELD

The embodiment discussed herein is directed to an automatic working device.

BACKGROUND

There has been known a conventional automatic working device that automatically determines the type of a target workpiece and performs an assembly operation, a processing operation, or the like on the target workpiece. The automatic working device is generally provided with a dedicated sensor to determine the type of a workpiece. This technique has been known as disclosed in, for example, Japanese Laid-open Patent Publication No. H10-15865.

However, because the conventional automatic working device requires to include a dedicated sensor in order to determine the type of a workpiece, there is a problem in that a cost is high.

SUMMARY

An automatic working device according to an aspect of an embodiment includes a robot hand and a determining unit. The robot hand grips a target workpiece. The determining unit determines the type of the workpiece on the basis of a gripping operation for making the robot hand grip a gripped piece that indicates the type of the workpiece provided in a supply vessel that supplies the workpiece to the robot hand.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an automatic working device according to an embodiment of the present disclosure will be explained in detail. In addition, the embodiment disclosed below is not intended to limit the present invention.

Figure 1:
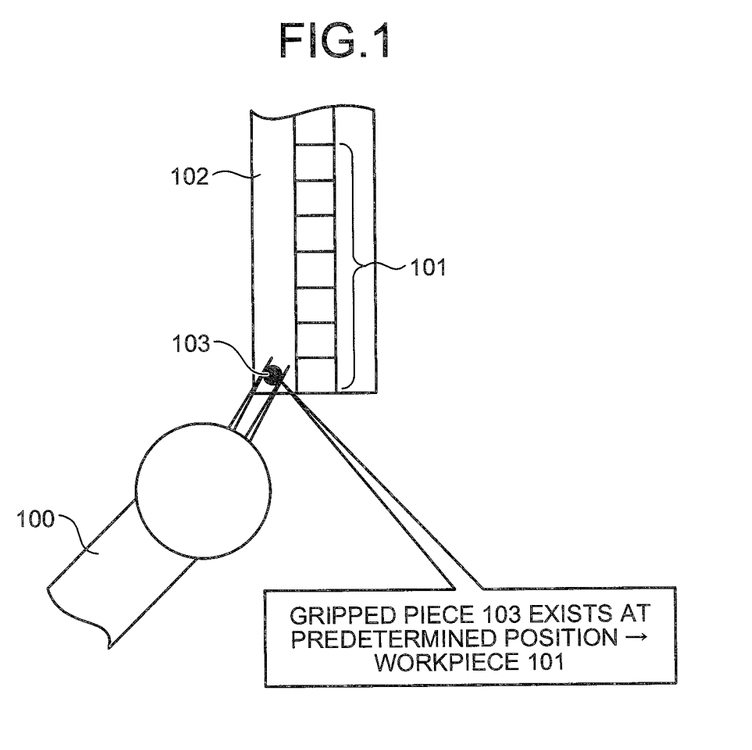
FIG. 1 is an explanation diagram illustrating an automatic working method according to an embodiment.

First, an automatic working method according to the embodiment is explained with reference to FIG. 1. FIG. 1 is an explanation diagram illustrating an automatic working method according to the embodiment.

Hereinafter, an automatic working method performed by an automatic working device including a robot hand that grips a target component (hereinafter, "workpiece") will be explained. The automatic working device includes a sensor that determines whether a workpiece is gripped by the robot hand.

In the automatic working method according to the embodiment, the automatic working device automatically determines the type of a workpiece before starting a work operation that is performed on the workpiece. More specifically, in the automatic working method according to the embodiment, a gripped piece 103 that indicates the type of a workpiece 101 in a supply vessel 102 that supplies the workpiece 101 to a robot hand 100 is previously provided at a predetermined position of the supply vessel 102 as illustrated in FIG. 1.

In other words, in the automatic working method according to the embodiment, the supply vessel 102 is prepared for each type of the workpiece 101. For example, when the supply vessel 102 is loaded with the workpiece 101, a part that is a loading mouth for the workpiece 101 is processed in a shape by which the supply vessel 102 can be loaded with only the specific workpiece 101.

As a result, it is expected that each the supply vessel 102 is loaded with only the same-type workpiece 101. Moreover, the gripped piece 103 of which the arrangement position is different for each type of the workpiece 101 is previously provided for each the supply vessel 102.

The automatic working device previously stores information on the arrangement position of the gripped piece 103 for each type of the workpiece 101. Before starting a work operation, the automatic working device performs a simulation operation for driving the robot hand 100 on the basis of the information on the arrangement position of the gripped piece 103 and gripping the gripped piece 103 at a predetermined position of the supply vessel 102.

Then, in the automatic working method according to the embodiment, the automatic working device determines the type of the workpiece 101 on the basis of the gripping position and gripping result of the gripped piece 103 performed by the robot hand 100. More specifically, the robot hand 100 includes a pair of grippers that grips the target workpiece 101 and an air cylinder (not illustrated) that drives the grippers.

The air cylinder displaces the pair of grippers from an opened state to a closed state to sandwich the workpiece 101 therebetween. The air cylinder includes a sensor (not illustrated) that detects whether the grippers are in the opened state or not the closed state in order to determine whether the workpiece 101 is gripped by the grippers. Moreover, the robot hand 100 includes a sensor (not illustrated) that detects a gripping position by the grippers.

Therefore, the automatic working device according to the embodiment uses a sensor that determines whether the workpiece 101 is gripped to determine the type of the workpiece 101. In other words, if the gripped piece 103 does not exist when the gripping operation of the gripped piece 103 of the supply vessel 102 is performed by the grippers, the sensor detects the closed state of the pair of grippers because the grippers come close up to a limit.

On the other hand, if the gripped piece 103 exists when the gripping operation of the gripped piece 103 of the supply vessel 102 is performed by the grippers, the sensor cannot detect the closed state because the pair of grippers sandwiches the gripped piece 103 therebetween. Alternatively, the sensor detects the opened state of the grippers.

In other words, the sensor that determines whether the workpiece 101 is gripped can determine whether the gripped piece 103 exists at the predetermined position of the supply vessel 102. Therefore, when the gripped piece 103 can be gripped by the robot hand 100 at the predetermined position, that is to say, when the gripped piece 103 exists at the predetermined position of the supply vessel 102, the automatic working device determines that a component of the supply vessel 102 is the workpiece 101.

On the other hand, when the gripped piece 103 cannot be gripped by the robot hand 100 at the predetermined position, that is to say, when the gripped piece 103 does not exist at the predetermined position of the supply vessel 102, the automatic working device determines that a component of the supply vessel 102 is not the workpiece 101.

In this way, in the automatic working method according to the embodiment, the automatic working device performs a simulation operation for gripping the gripped piece 103 provided at the predetermined position of the supply vessel 102 by using the robot hand 100 and determines the type of the workpiece 101 in accordance with whether the gripped piece 103 can be gripped.

As a result, in the automatic working method according to the embodiment, an existing sensor that determines whether the workpiece 101 can be gripped can determine the type of the workpiece 101 without providing a dedicated sensor for determining the type of the workpiece 101 in the automatic working device. Therefore, according to the automatic working device according to the embodiment, the cost of the automatic working device can be suppressed.

Moreover, the robot hand 100 may have a configuration for driving the grippers by using a servo motor. In the case of this configuration, the automatic working device previously stores the rotation position of the servo motor when the gripped piece 103 is gripped by the grippers.

Then, when the type of the workpiece 101 is determined, the automatic working device outputs a rotation command for displacing the grippers from the opened state to the closed state to the servo motor. Next, the automatic working device compares the previously stored rotation position of the servo motor when the gripped piece 103 is gripped and the rotation position of the servo motor when the gripped piece 103 cannot be gripped, so as to determine the presence or absence of the gripped piece 103 and determine the type of the workpiece 101.

Figure 5:
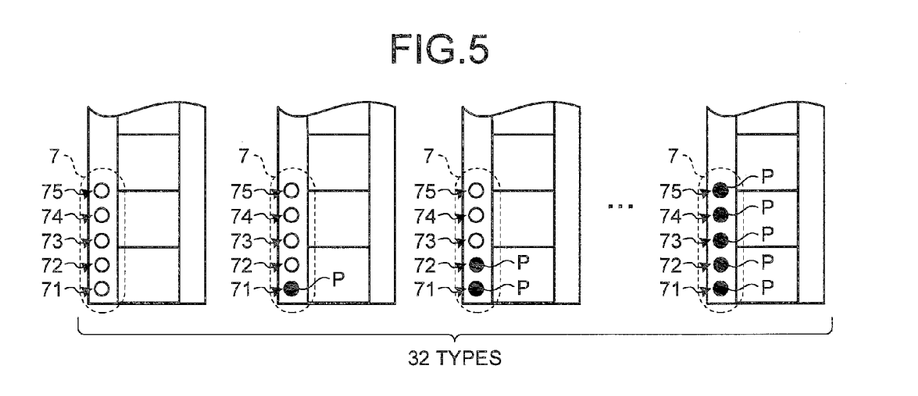
FIG. 5 is a diagram illustrating an example of an arrangement position of a gripped piece according to the embodiment.

It has been explained in FIG. 1 that the number of the gripped pieces is one. However, the number of the gripped pieces may be two or more for each the supply vessel 102. In this case, the plurality of gripped pieces 103 provided in each the supply vessel 102 is arranged in such a manner that each type of the workpiece 101 has the different arrangement position combination.

Then, the automatic working device determines the type of the workpiece 101 on the basis of the combination of the gripping position and gripping result of the gripped pieces 103 performed by the robot hand 100. As a result, even if the number of types of the workpiece 101 is increased, the automatic working device can precisely determine the type of the workpiece 101. Moreover, this, point is described below with reference to FIG. 5.

Figure 2:
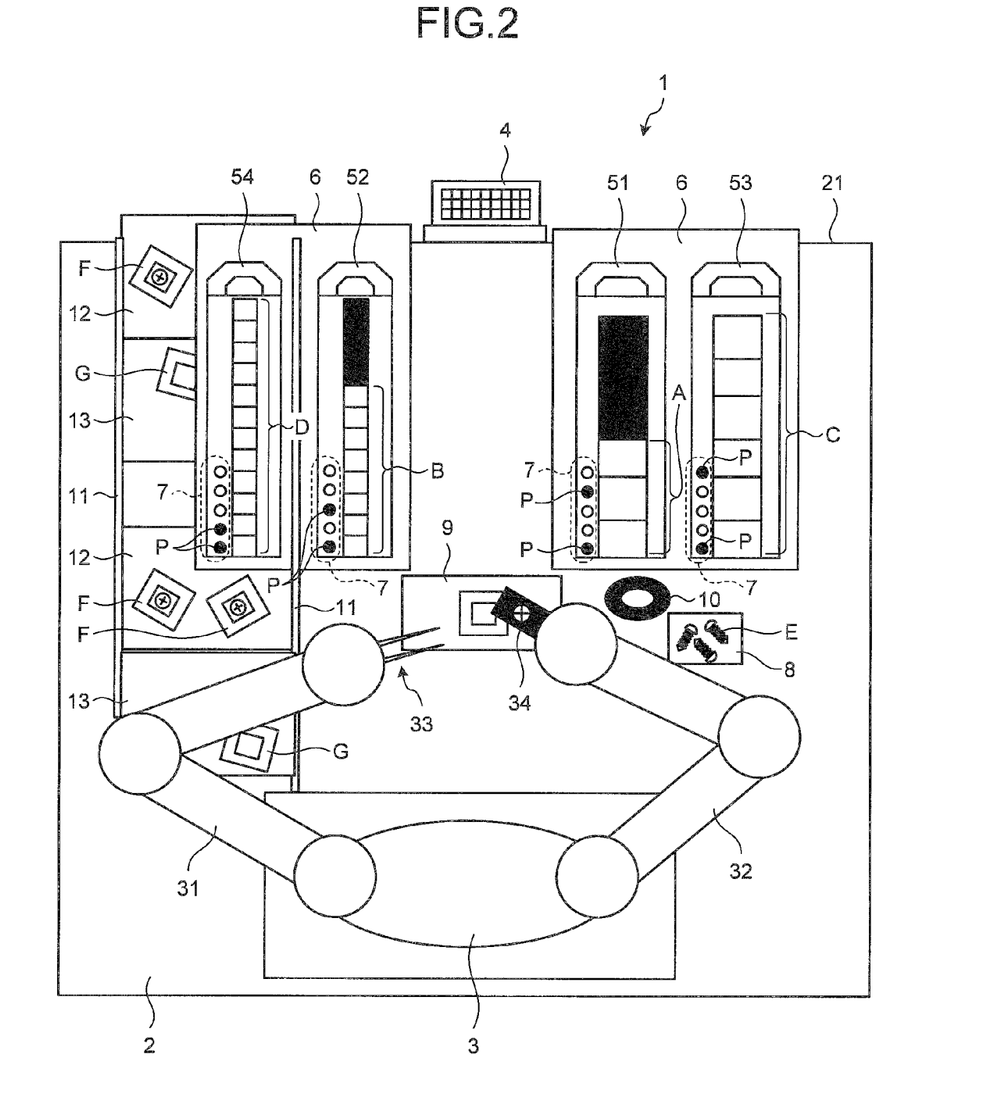
FIG. 2 is a plan view illustrating a layout of an automatic working device according to the embodiment.
Figure 3:
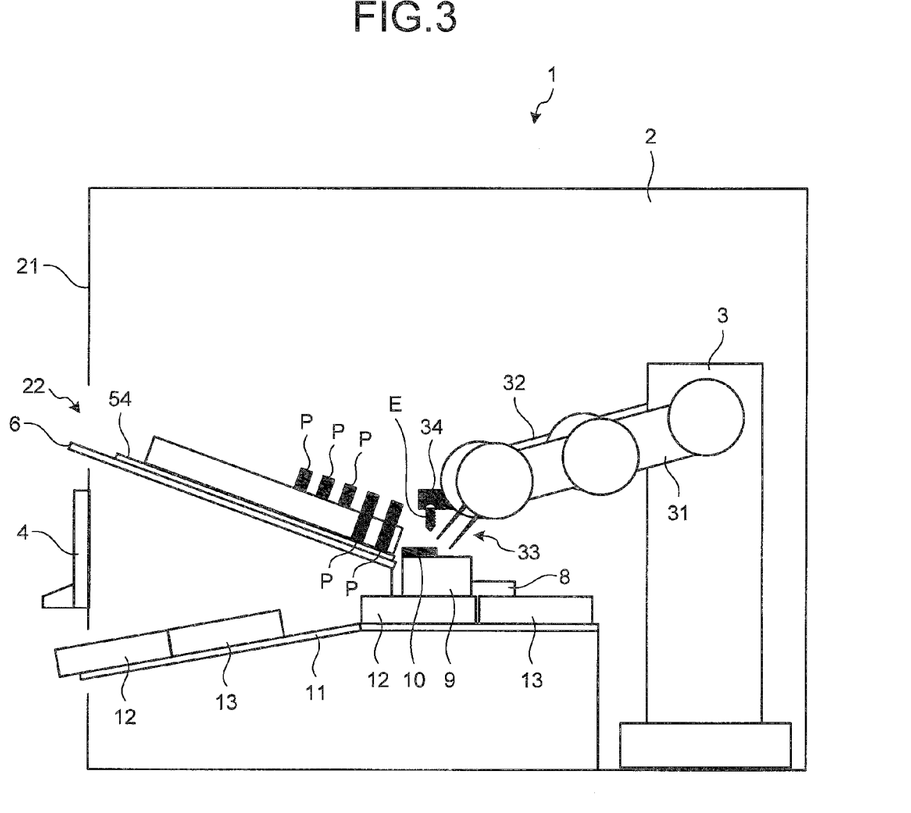
FIG. 3 is a side view illustrating the layout of the automatic working device according to the embodiment.

Hereinafter, the configuration and operation of the automatic working device according to the embodiment will be further explained in detail. FIG. 2 is a plan view illustrating a layout of an automatic working device 1 according to the embodiment. FIG. 3 is a side view illustrating the layout of the automatic working device 1 according to the embodiment. Moreover, the automatic working device 1 is schematically illustrated in FIGS. 2 and 3.

As illustrated in FIGS. 2 and 3, the automatic working device 1 includes a robot 3 and a display operating unit 4. The robot 3 performs a predetermined work operation in a working booth 2 surrounded by wall surfaces in four directions. The display operating unit 4 is provided outside a predetermined wall surface 21 of the working booth 2 and inputs an instruction on the work operation to the robot 3.

The robot 3 includes two robot hands 31 and 32 that perform a work operation corresponding to the instruction input by the display operating unit 4. Hereinafter, the robot hand 31 illustrated at the left side of FIG. 2 is referred to as the left hand 31 and the robot hand 32 illustrated at the right side is referred to as the right hand 32. Moreover, when the distinction between the left hand 31 and the right hand 32 is not required, they are simply referred to as the hand without the reference numbers.

The left hand 31 includes a gripper 33 that grips an object by sandwiching it therebetween, an air cylinder (not illustrated) that drives the gripper 33 to change its state between an opened state and a closed state, and a sensor that is provided in the air cylinder to detect the opened state and the closed state of the gripper 33.

For example, when the gripper 33 includes a clamp for sandwiching the object, the sensor can use a sensor that detects an opening amount of the clamp when the object is gripped by the clamp and a pressure that acts on the clamp. Moreover, the left hand 31 includes a sensor (not illustrated) that detects a gripping position of the gripper 33. These sensors output the detection result to a control unit 30 to be described below (see FIG. 4).

The right hand 32 includes an electric driver 34 that adsorbs a screw E from a screw vessel 8 and performs threadable fixing. Moreover, the electric driver 34 is an example of a tool. The electric driver 34 may be another tool or may be the gripper 33 that performs the same work operation as that of the left hand 31. An example of a work operation performed by the hand is described below with reference to FIGS. 8 and 9.

Moreover, the working booth 2 is provided with a plurality of supply vessels 51, 52, 53, and 54 that respectively supply workpieces A, B, C, and D to the hand. The supply vessels 51, 52, 53, and 54 are provided in correspondence with the types of the workpieces A, B, C, and D.

More specifically, the supply vessels 51, 52, 53, and 54 are processed in such a manner that shapes of loading mouths for being loaded with the workpieces A, B, C, and D can hold only the respective specific workpieces A, B, C, and D.

As a result, the supply vessels 51, 52, 53, and 54 are respectively loaded with only the same-type workpieces A, B, C, and D. For example, the supply vessel 51 is loaded with only the multiple workpieces A on a line, of which the type is the same.

Hereinafter, when any of the supply vessels 51, 52, 53, and 54 is referred to, only the supply vessel is simply referred to without the reference numbers. Moreover, when any of the workpieces A, B, C, and D is referred to, only the workpiece is simply referred to without the reference numbers.

Each of the supply vessels is loaded with the workpieces outside the working booth 2, is carried to a predetermined place in the working booth 2 through a carrying-in window 22 (see FIG. 3) provided on the predetermined wall surface 21 of the working booth 2, and is provided on the predetermined place. In this case, all the supply vessels are provided at the predetermined wall surface 21 side of the working booth 2.

As a result, when the workpiece is taken out from each the supply vessel by using the left hand 31, the space-saving of the working booth 2 can be achieved because the movable range of the left hand 31 can be narrowed.

Moreover, the supply vessels are held by a holding pedestal 6 in such a manner that they are downward inclined from the predetermined wall surface 21 of the working booth 2 toward the working area of the hands. Each of the supply vessels is provided with a taking unit for taking out the workpiece at the position closest to the hand in a state where the supply vessels are held on the holding pedestal 6.

Each of the supply vessels has a configuration that the workpiece in the supply vessel moves to the direction of the hand inside the supply vessel due to its own weight whenever the workpiece is taken out from the taking unit by the left hand 31.

For this reason, the left hand 31 can sequentially take out the workpieces moved to the nearest position from the supply vessel and perform an operation on the workpieces. As a result, because a movable range in which the left hand 31 takes out the workpiece from the supply vessel can be narrowed, the space-saving of the working booth 2 can be achieved.

Each of the supply vessels is provided with a gripped piece P that indicates the type of a workpiece at predetermined position 7. The automatic working device 1 performs a simulation operation for gripping the gripped piece P by using the left hand 31 to determine the type of the workpiece in each of the supply vessels before the robot 3 starts a work operation. The specific example of the simulation operation is described below with reference to FIG. 7.

After that, the robot 3 takes out the workpiece required for the work operation from the supply vessel and performs assembly and threadable fixing operations on the workpiece by using a working jig 9 provided in the working area. Moreover, when the robot 3 fails in the threadable fixing operation performed by the right hand 32 and thus the screw E remains in the electric driver 34, the robot 3 removes the screw E from the right hand 32 by using a screw taking tool 10. The screw taking operation is described below with reference to FIG. 9.

Moreover, the working booth 2 is provided with a vessel for work completion (hereinafter, "finished product vessel 12") into which non-defective units (hereinafter, "finished products F") among products on which the work operation has been completed by the hand are carried by the left hand 31.

Moreover, the working booth 2 is provided with a vessel for work completion (hereinafter, "defective vessel 13") into which defectives G among the products on which the work operation has been completed by the hand are carried by the left hand 31. Moreover, the working booth 2 is provided with a taking-out path 11 that takes out the finished product vessel 12 and the defective vessel 13 to the outside of the working booth 2.

The taking-out path 11 is provided to be downward inclined from the working area of the hand toward the predetermined wall surface 21 of the working booth 2. Before the work operation is started, the hand takes out the finished product vessel 12 and the defective vessel 13 from a predetermined vessel storage space (not illustrated) in the working booth 2 and sets them onto the taking-out path 11.

Then, when the predetermined number of finished products F are assembled and carried into the finished product vessel 12, the left hand 31 pushes the finished product vessel 12 and the defective vessel 13 toward the predetermined wall surface 21 of the working booth 2.

As a result, the finished product vessel 12 and the defective vessel 13 are pushed by a pressing force from the left hand 31 toward the predetermined wall surface 21, and then slip down toward the predetermined wall surface 21 on the inclined taking-out path 11 due to their own weights and are taken out to the outside of the working booth 2.

In this way, the working booth 2 is provided with the taking-out path 11 at the predetermined wall surface 21 side of the working booth 2 similarly to the supply vessel in such a manner that the supply vessel and the taking-out path 11 are placed up and down (see FIG. 3), and thus the space-saving of the working booth 2 is achieved.

In the working booth 2, because the finished product vessel 12 and the defective vessel 13 are only pushed by the left hand 31 and thus are taken out to the outside of the working booth 2 due to their own weights, taking out does not require an electric belt conveyor or the like. Therefore, an installation cost and a running cost of a taking-out operation can be suppressed.

Moreover, the operation of the left hand 31 when the finished product F and the defective G are taken out from the working booth 2 is only an operation for pushing the finished product vessel 12 and the defective vessel 13 up to the position at which the finished product vessel 12 and the defective vessel 13 begin to slide under their own weights. In this way, because the movable range of the left hand 31 when the finished product F and the defective G are taken out from the working booth 2 can be narrowed, the space of the working booth 2 can be further saved.

Figure 4:
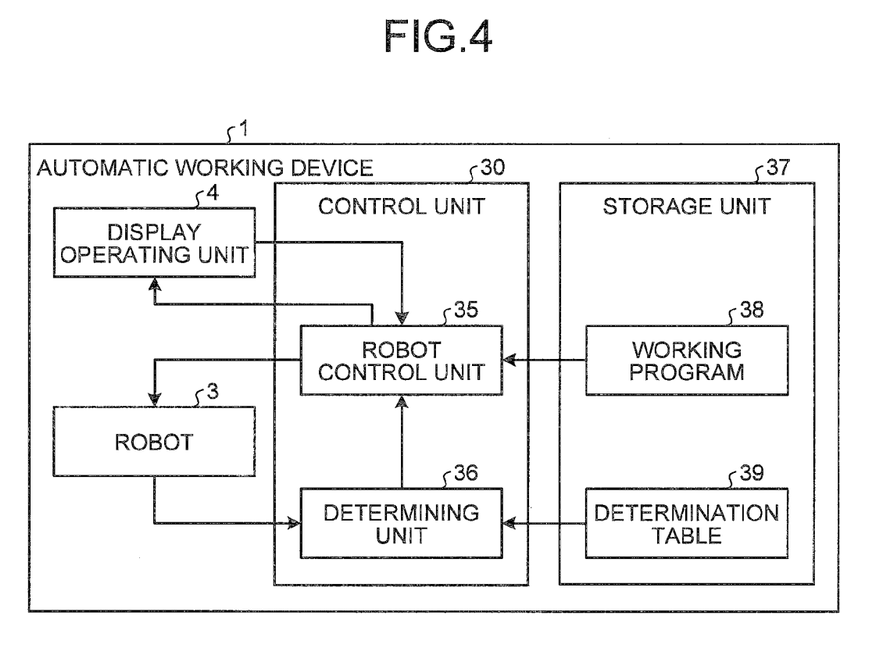
FIG. 4 is a block diagram illustrating the configuration of the automatic working device according to the embodiment.

Next, the configuration of the automatic working device 1 will be explained with reference to FIG. 4. FIG. 4 is a block diagram illustrating the configuration of the automatic working device 1 according to the embodiment. Moreover, only components needed to explain the characteristic of the automatic working device 1 is illustrated in FIG. 4 and general components are not illustrated.

As illustrated in FIG. 4, the automatic working device 1 includes the display operating unit 4, the robot 3, the control unit 30, and a storage unit 37. The display operating unit 4 includes an operating unit such as a keyboard and a button switch that inputs a work description or the like for the robot 3 and a display unit that displays the work description input by the operating unit or the working state of the robot 3. Moreover, because the configuration of the robot 3 has been already explained with reference to FIGS. 2 and 3, their descriptions are omitted.

The control unit 30 is a processing unit that totally controls the automatic working device 1. The control unit 30 includes a robot control unit 35 and a determining unit 36. Moreover, the storage unit 37 is a memory and stores therein a working program 38 and a determination table 39.

The working program 38 is a previously created program that is executed by the control unit 30 to make the robot 3 perform various types of operations. The determination table 39 is information that is referred to by the control unit 30 when the type of the workpiece is determined. The determination table 39 is described below with reference to FIG. 6.

The control unit 30 can be constituted by, for example, a computer. In this case, the control unit 30 is a central processing unit (CPU) and functions as the robot control unit 35 by loading and executing the working program 38 from the storage unit 37.

The robot control unit 35 is a processing unit that outputs a control signal to the robot 3 on the basis of the working program 38 and controls an operation of the hand to make the robot perform a work operation. For example, when the supply place of the workpieces A and B used for the work operation is designated from the display operating unit 4, the robot control unit 35 controls to take out the workpieces A and B from the designated supply place and perform a predetermined work operation on the designated workpieces A and B.

Before the work operation is started, the robot control unit 35 performs a simulation operation for driving the left hand 31 and making the left hand 31 grip the gripped piece P (see FIG. 2) provided in the supply vessel, and receives the type of the workpiece determined by the determining unit 36 on the basis of the simulation operation from the determining unit 36.

For example, when the supply place of the workpieces A and B is designated from the display operating unit 4, the robot control unit 35 performs the simulation operation for making the left hand 31 grip the gripped pieces P (see FIG. 2) of the supply vessels 51 and 52 provided in the designated supply place.

Next, the robot control unit 35 determines whether the supply vessel 51 that is loaded with the workpiece A and the supply vessel 52 that is loaded with the workpiece B are correctly provided at the designated supply places on the basis of the types of the workpieces A and B input from the determining unit 36.

Then, when it is determined that the supply vessel 51 that is loaded with the workpiece A and the supply vessel 52 that is loaded with the workpiece B are correctly provided, the robot control unit 35 starts the work operation. On the other hand, when it is determined that the supply vessel 51 and 52 are not correctly provided at the designated supply place, the robot control unit 35 outputs information indicative of that effect to the display operating unit 4 and makes the display operating unit 4 display the information.

The determining unit 36 determines the type of the workpiece on the basis of the gripping position and gripping result of the gripped piece P by the left hand 31 determined by the detection result performed by the sensor provided in the left hand 31 and the determination table 39 that is stored in the storage unit 37. Then, the determining unit 36 outputs the determined type of the workpiece to the robot control unit 35.

In this way, in the automatic working device 1, because the determining unit 36 determines the type of the workpiece on the basis of the gripping position and gripping result of the gripped piece P by the left hand 31, it is not necessary to provide a dedicated sensor for determining the type of the workpiece. For this reason, the automatic working device 1 can realize a low cost.

Figure 6:
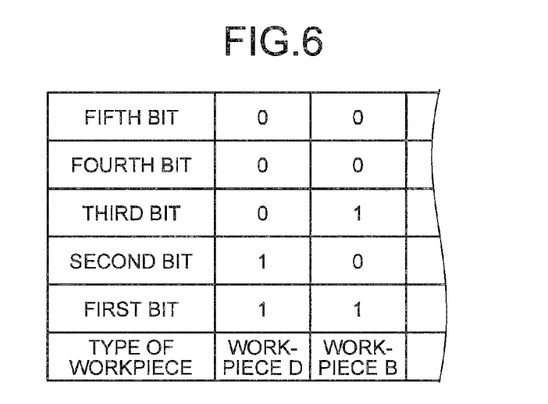
FIG. 6 is a diagram illustrating an example of a determination table according to the embodiment.

Next, an example of the arrangement position of the gripped pieces P and the determination table 39 will be explained with reference to FIGS. 5 and 6. FIG. 5 is a diagram illustrating an example of the arrangement position of the gripped pieces P according to the embodiment. FIG. 6 is a diagram illustrating an example of the determination table 39 according to the embodiment.

The gripped pieces P are arranged at the predetermined position 7 of each of the supply vessels in such a manner that the combinations of the arrangement positions are different in accordance with the types of the workpieces. For example, as illustrated in FIG. 5, five arrangement positions 71, 72, 73, 74, and 75 by which whether the gripped pieces P are arranged can be selected are previously defined in the predetermined position 7 of the supply vessel.

Then, the combinations of arrangement positions of the gripped pieces P can be indicated by 32 types of workpieces at a maximum by changing an arrangement combination by which the gripped pieces P are arranged at the arrangement positions 71, 72, 73, 74, and 75 of the supply vessel for each type of the workpieces.

In FIG. 5, among the five arrangement positions defined in the predetermined position 7, positions at which the gripped pieces P are arranged are indicated with a black circle and positions at which the gripped pieces P are not arranged are indicated with a white circle. Hereinafter, the five arrangement positions defined in the predetermined position 7 illustrated in FIG. 5 are referred to as a first bit 71, a second bit 72, a third bit 73, a fourth bit 74, and a fifth bit 75 in sequence from the bottom. Moreover, the number of the bits is only an example. Therefore, the number of the bits can be optionally changed in accordance with a design.

As described above, before the robot 3 starts the work operation, the gripped piece P is gripped by the left hand 31. For this reason, the gripped piece P can be used for an operation check of the left hand 31 before the work operation performed by the robot 3 is started.

In the present embodiment, the gripped pieces P are provided in all the first bits 71 of the supply vessels, and the gripping operation is performed on the gripped pieces P by using the left hand 31 in sequence from the first bit 71 when the type of the workpiece is determined by the automatic working device 1 before the work operation is started.

As a result, when the gripped piece P provided in the first bit 71 cannot be gripped by the left hand 31, the automatic working device 1 can determine that the operation of the left hand 31 is bad. Therefore, the automatic working device 1 can perform an operation check on the left hand 31 before the work operation is started at a time at which the determination of the type of the workpiece is started.

When the gripped pieces P are provided in all the first bits 71 of the supply vessels, the types of the workpieces that can be indicated by the combinations of arrangement positions of the gripped pieces P are 16 types.

When the previously-described first to fifth bits 71 to 75 are defined as the positions at which the gripped pieces P can be arranged, the storage unit 37 stores the determination table 39 that associates the type of the workpiece with the combination (presence or absence) of the gripped pieces P corresponding to the bits as illustrated in FIG. 6. Moreover, the determination table 39 illustrated in FIG. 6 indicates that a bit at which the gripped piece P is arranged is "1" and a bit at which the gripped piece P is not arranged is "0".

Figure 7:
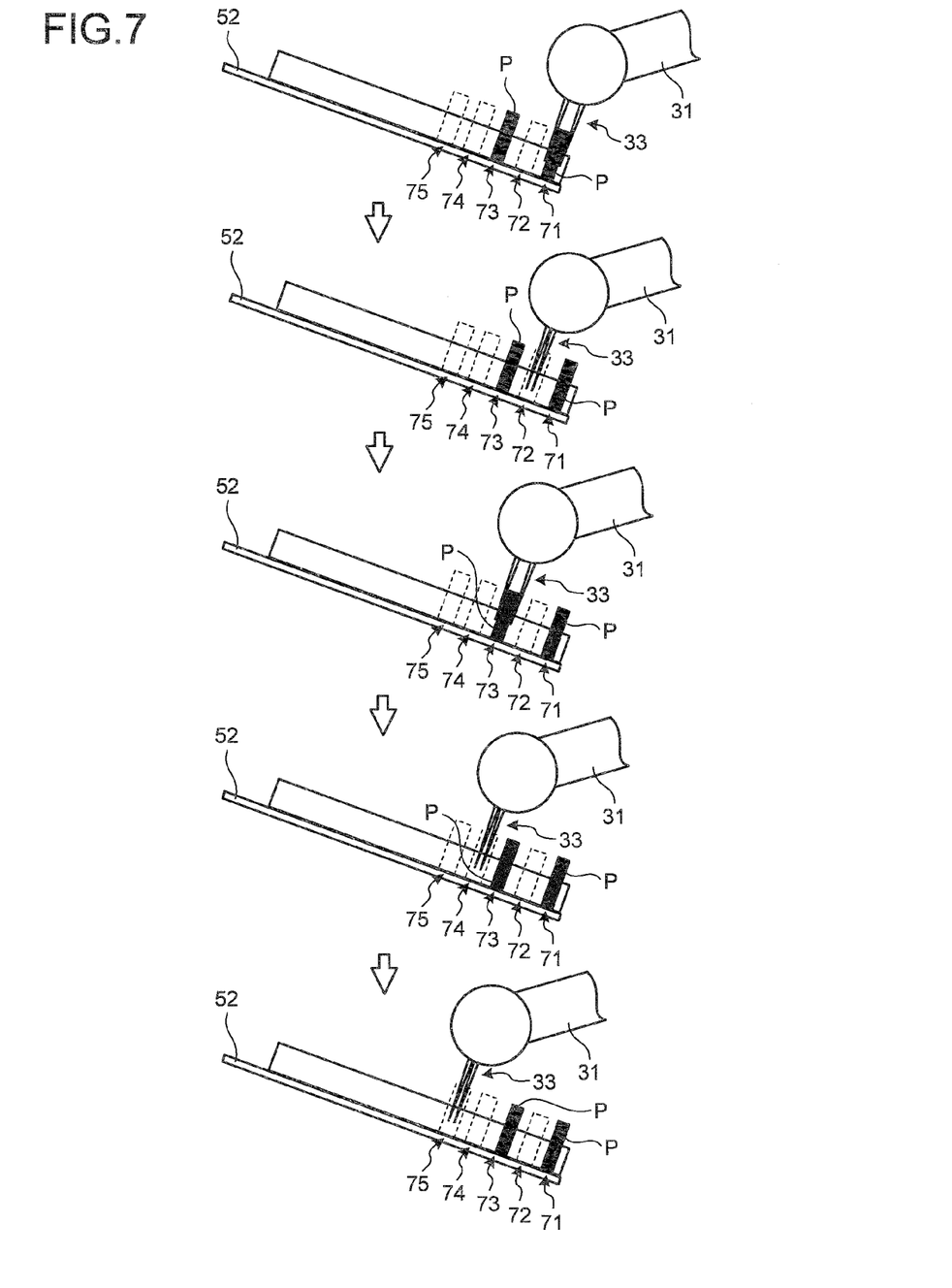
FIG. 7 is a diagram illustrating an example of a workpiece determination operation according to the embodiment.

Then, the determining unit 36 of the automatic working device 1 determines the type of the workpiece on the basis of the gripping position and gripping result of the gripped piece P performed by the left hand 31 and the determination table 39. Next, an example of a determination operation for determining the type of the workpiece by using the left hand 31 will be explained with reference to FIG. 7. FIG. 7 is a diagram illustrating an example of a workpiece determination operation according to the embodiment.

In the automatic working device 1, when the type of the workpiece B in the supply vessel 52 is determined, the left hand 31 performs a gripping operation for gripping the gripped pieces P by using the gripper 33 in the order of the first bit 71, the second bit 72, the third bit 73, the fourth bit 74, and the fifth bit 75, as illustrated in FIG. 7.

Then, the determining unit 36 checks the gripping result and the detection result of the gripping operation with the determination table 39 illustrated in FIGS. 6 and 7 to determine the type of the workpiece. In the example illustrated in FIG. 6, the gripped pieces P are gripped by the gripper 33 at the first bit 71 and the third bit 73, and the gripped pieces P are not gripped at the second bit 72, the fourth bit 74, and the fifth bit 75.

Therefore, assuming that the gripping result is "1" when the gripped piece P is gripped and the gripping result is "0" when the gripped piece P is not gripped, the gripping result of the example illustrated in FIG. 7 is "1, 0, 1, 0, 0" in sequence from the first bit 71.

For this reason, the determining unit 36 determines that the workpiece of the supply vessel 52 is the type "workpiece B" of the workpiece associated with the gripping result called "1, 0, 1, 0, 0" through the determination table 39 (see FIG. 6).

Herein, it has been explained that the left hand 31 performs a simulation operation for gripping the gripped piece P at all the positions of the first to fifth bits 71 to 75. However, it is not necessarily required to grip the gripped piece P at all the positions of the first to fifth bits 71 to 75.

For example, when the types of the workpiece to be determined are two types, the type of each workpiece can be determined in accordance with whether the gripped piece P exists at the second bit 72 even if the first bit 71 is used for checking the operation of the left hand 31.

On the other hand, when the types of the workpiece to be determined are four types, the type of each workpiece can be determined in accordance with different combinations of arrangement positions of the gripped pieces P at the second bit 72 and the third bit 73 even if the first bit 71 is used for checking the operation of the left hand 31.

In this way, when it is not required to perform the simulation operation for gripping the gripped pieces P at all the positions of the first to fifth bits 71 to 75, the reduction of a working time can be achieved by breaking off the simulation operation on each supply vessel on the way at the time at which the type of the workpiece is determined.

Figure 8:
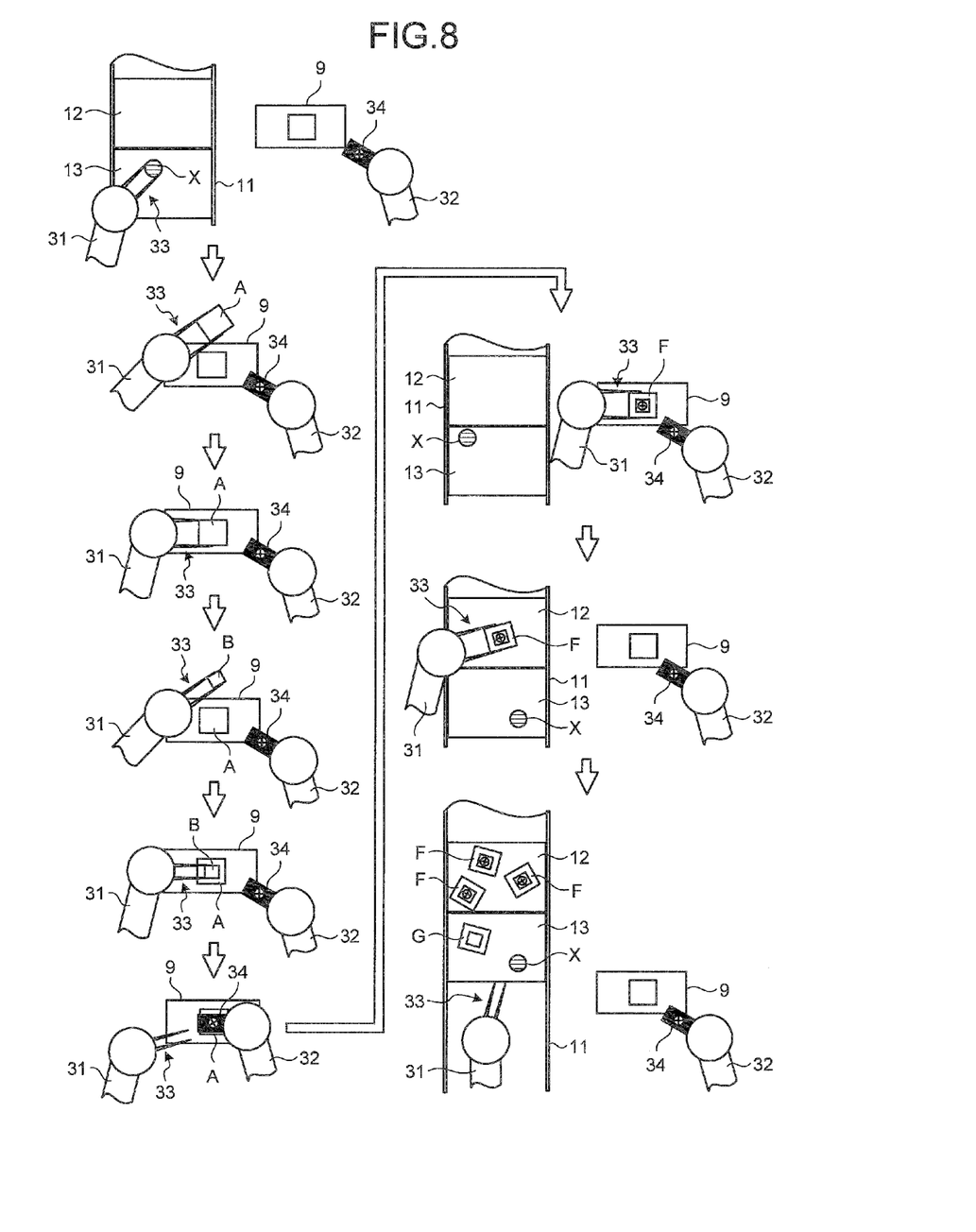
FIG. 8 is a diagram illustrating an example of an operation according to the embodiment.

Next, an example of a work operation performed by the hand will be explained with reference to FIG. 8. FIG. 8 is a diagram illustrating an example of a work operation according to the embodiment. Hereinafter, it will be explained that the workpiece A and the workpiece B are overlapped and are threadably fixed by the screw E to assemble the finished product F.

The automatic working device 1 determines the types of the workpieces A and B designated as a working target on the basis of the gripping operation of the gripped piece P performed by the left hand 31. As a determination result, when the supply vessel 51 of the workpiece A and the supply vessel 52 of the workpiece B are correctly provided, the automatic working device 1 performs the work operation illustrated in FIG. 8.

More specifically, as illustrated in FIG. 8, before the work operation is started, the automatic working device 1 takes out the finished product vessel 12 and the defective vessel 13 from the predetermined vessel storage space (not illustrated) in the working booth 2 and sets them on the taking-out path 11. Next, the left hand 31 throws a mark X into the defective vessel 13. The mark X is a distinction member that distinguishes the finished product vessel 12 from the defective vessel 13.

In this way, because the mark X is previously thrown into the defective vessel 13 by the left hand 31, an operator can easily determine the finished product vessel 12 and the defective vessel 13 when the work operation is completed and thus the finished product vessel 12 and the defective vessel 13 are taken out to the outside of the working booth 2.

Next, the left hand 31 takes out the workpiece A from the supply vessel 51 by using the gripper 33 and sets it at a predetermined position of the jig 9. Next, the left hand 31 takes out the workpiece B from the supply vessel 52 by using the gripper 33 and sets it at a predetermined position on the workpiece A that is set in the jig 9.

Next, the right hand 32 adsorbs the screw E from the screw vessel 8 by using the electric driver 34 having an adsorption function, and threadably fixes the workpieces A and B to each other by using the screw E to assemble the finished product F.

Next, the left hand 31 grips the finished product F by using the gripper 33 and sends it into the finished product vessel 12. On the other hand, when the assembled product is the defective G, the left hand 31 grips the defective G by using the gripper 33 and sends it into the defective vessel 13.

For example, when the screw E used for threadable fixing by the electric driver 34 of the right hand 32 remains in the electric driver 34, the automatic working device 1 determines that the assembled product is the defective G and sends it into the defective vessel 13 by using the left hand 31. Moreover, whether the screw E remains in the electric driver 34 can be detected, for example, by providing a sensor (not illustrated) for detecting the screw E in the adsorption unit of the electric driver 34.

Moreover, when the screw E remains in the electric driver 34, the right hand 32 removes the screw E from the electric driver 34 by using the screw taking tool 10. A removal operation of the screw E performed by the right hand 32 is described below with reference to FIG. 9.

Next, when the predetermined number of the finished products F is assembled and is taken into the finished product vessel 12, the left hand 31 pushes the defective vessel 13 toward the predetermined wall surface 21 of the working booth 2. As a result, the defective vessel 13 and the finished product vessel 12 slip down onto the taking-out path 11 due to their own weights and are taken out to the outside of the working booth 2.

Figure 9:
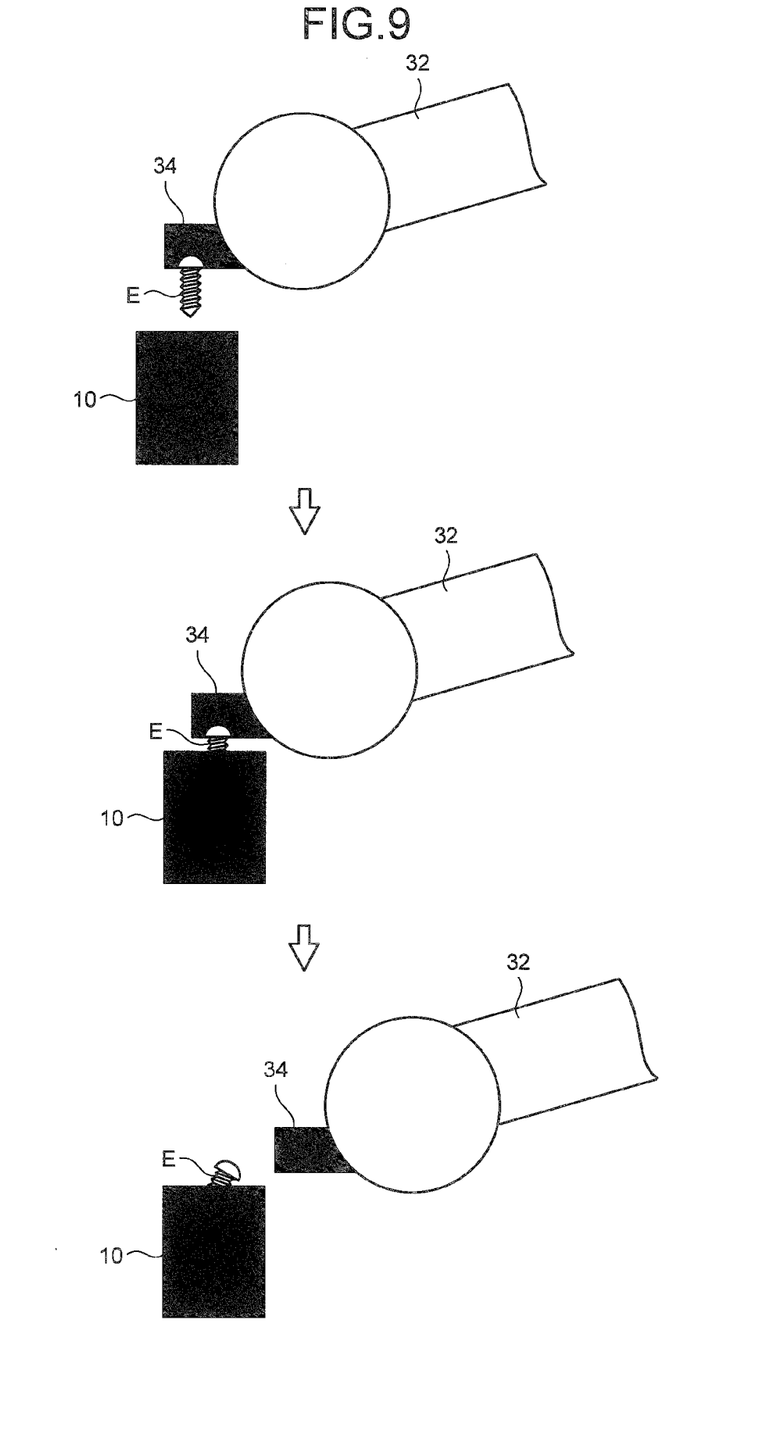
FIG. 9 is a diagram illustrating an example of a screw removal operation according to the embodiment.

Next, a removal operation of the screw E performed by the right hand 32 will be explained with reference to FIG. 9. FIG. 9 is a diagram illustrating an example of a screw removal operation according to the embodiment. As illustrated in FIG. 9, when the screw E remains in the electric driver 34, the right hand 32 moves the electric driver 34 up to the position of the screw taking tool 10.

Next, the right hand 32 fits the screw E into a fitting hole that can fit therein the screw E provided in the screw taking tool 10. Next, the right hand 32 slides the electric driver 34 along the top face of the screw taking tool 10 to discard and remove the screw E remaining in the electric driver 34 into the screw taking tool 10.

In this way, the right hand 32 can perform the threadable fixing operation performed by the electric driver 34, and then automatically remove the unnecessary screw E from the electric driver 34 by using the screw taking tool 10 when the screw E remains in the electric driver 34.

Figure 10:
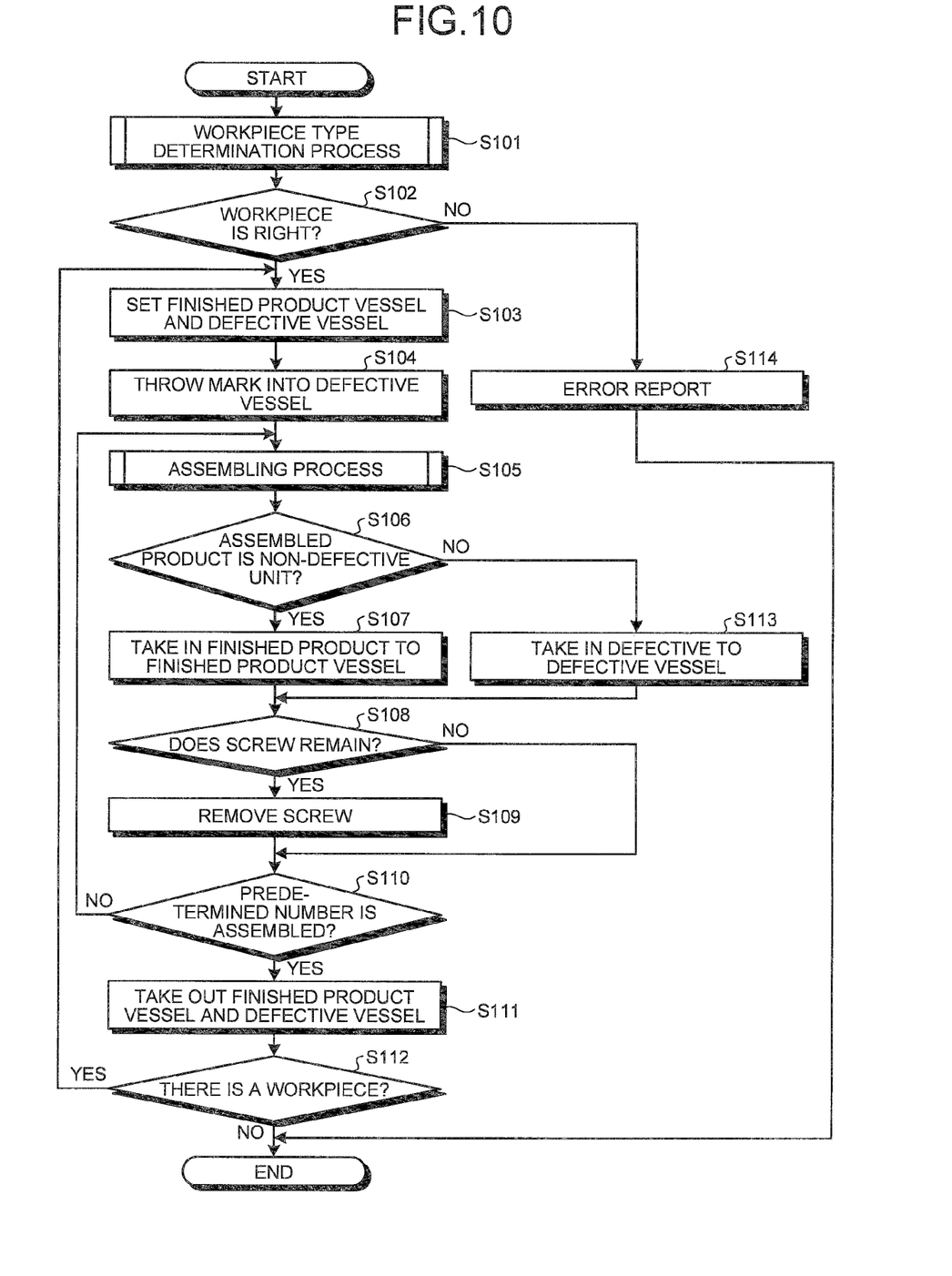
FIG. 10 is a flowchart illustrating a main process that is performed by a control unit of the automatic working device according to the embodiment.
Figure 11:
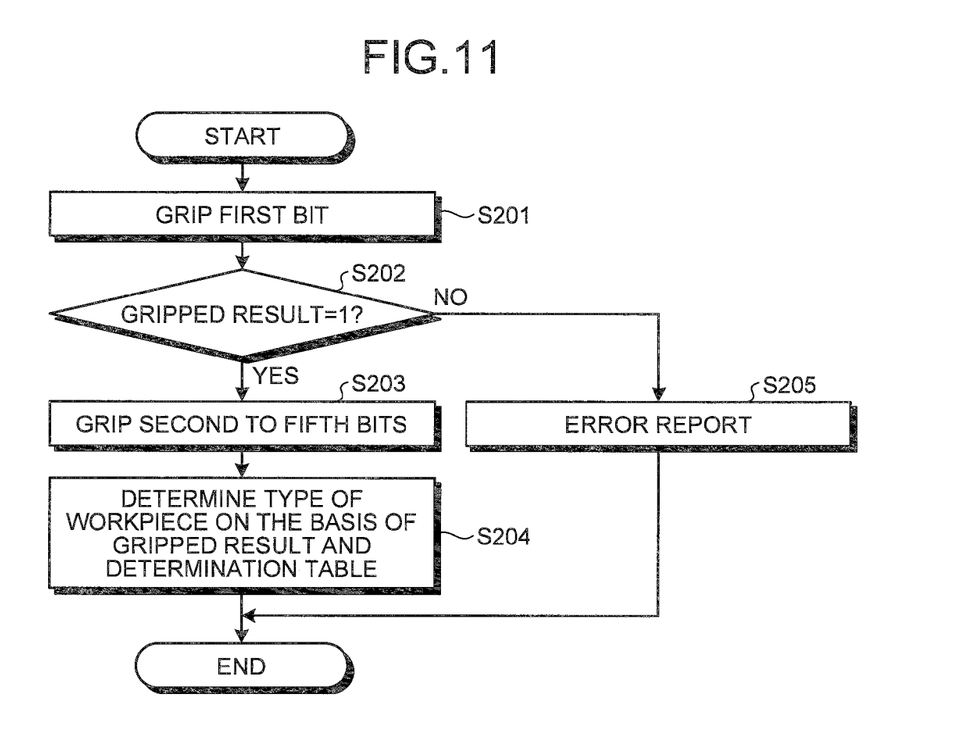
FIG. 11 is a flowchart illustrating a workpiece type determination process that is performed by the control unit of the automatic working device according to the embodiment.

Next, a process performed by the control unit 30 of the automatic working device 1 will be explained with reference to FIGS. 10 and 11. FIG. 10 is a flowchart illustrating a main process that is performed by the control unit 30 of the automatic working device 1 according to the embodiment. FIG. 11 is a flowchart illustrating a workpiece type determination process that is performed by the control unit 30 of the automatic working device 1 according to the embodiment.

When the supply place of workpieces used for the work operation is designated from the display operating unit 4, the control unit 30 starts the main process illustrated in FIG. 10. More specifically, as illustrated in FIG. 10, the control unit 30 first performs a workpiece type determination process (Step S101). The workpiece type determination process is described below with reference to FIG. 11.

Next, the control unit 30 determines whether the supply vessel that is loaded with the correct workpieces as a working target is provided in the supply place of the workpiece designated by the display operating unit 4 on the basis of the type of the workpiece determined in the workpiece type determination process (Step S102).

In other words, the control unit 30 determines whether the workpiece of the supply vessel provided in the place designated as the supply place of the workpiece is a correct workpiece as a working target (Step S102). Then, when it is determined that the workpiece is not a correct workpiece (Step S102: No), the control unit 30 makes, for example, the display operating unit 4 display text information indicating that "an incorrect workpiece is set" to report an error (Step S114), and terminates the process.

On the other hand, when it is determined that the workpiece is a correct workpiece (Step S102: Yes), the control unit 30 sets the finished product vessel 12 and the defective vessel 13 at the predetermined position on the taking-out path 11 by using the left hand 31 (Step S103). Next, the control unit 30 makes the left hand 31 throw the mark X into the defective vessel 13 (Step S104).

Next, the control unit 30 executes an assembling process (Step S105) to makes the hand perform an assembly operation on the workpiece. Because the assembly operation has been already explained with reference to FIG. 8, their descriptions are omitted.

Next, the control unit 30 determines whether the assembled product is a non-defective unit (Step S106). When it is determined that the assembled product is a non-defective unit (Step S106: Yes), the control unit 30 makes the left hand 31 take the finished product F into the finished product vessel 12 (Step S107).

On the other hand, when it is determined that the assembled product is a defective (Step S106: No), the control unit 30 makes the left hand 31 take the defective G into the defective vessel 13 (Step S113).

Next, the control unit 30 determines whether the screw E remains in the electric driver 34 (Step S108). When it is determined that the screw E remains (Step S108: Yes), the control unit 30 removes the remaining screw E (Step S109) and moves the process to Step S110.

On the other hand, when it is determined that the screw E does not remain in the electric driver 34 (Step S108: No), the control unit 30 moves the process to Step S110. Next, the control unit 30 determines whether the predetermined number of the finished products F is assembled (Step S110).

Then, when it is determined that the predetermined number of the finished products F is assembled (Step S110: Yes), the control unit 30 makes the left hand 31 take out the finished product vessel 12 and the defective vessel 13 from the working booth 2 (Step S111) and moves the process to Step S112. On the other hand, when it is determined that the predetermined number of the finished products F is not assembled (Step S110: No), the control unit 30 moves the process to Step S105.

At Step S112, the control unit 30 determines whether a workpiece exists in the supply vessel of which the supply place is designated by the display operating unit 4. When it is determined that a workpiece exists (Step S112: Yes), the control unit 30 moves the process to Step S103. On the other hand, when it is determined that a workpiece does not exist (Step S112: No), the control unit 30 terminates the process.

Next, the workpiece type determination process performed at Step S101 by the control unit 30 will be explained with reference to FIG. 11. When the workpiece type determination process is started, the control unit 30 first makes the left hand 31 grip the gripped piece P at the position of the first bit 71 as illustrated in FIG. 11 (Step S201).

Next, the control unit 30 determines whether the gripping result of the first bit 71 is "1" (Step S202). Herein, when the gripped piece P can be gripped at the first bit 71, the control unit 30 determines that the gripping result is "1". On the other hand, when the gripped piece P cannot be gripped at the first bit 71, the control unit 30 determines that the gripping result is "0".

Then, when it is determined that the gripping result is "1" (Step S202: Yes), the control unit 30 moves the process to Step S203. On the other hand, when it is determined that the gripping result is "0" (Step S202: No), the control unit 30 determines that the operation of the left hand 31 is bad and makes the display operating unit 4 display information indicative of that effect, for example, text information such as "left hand is bad" to report an error (Step S205). After that, the control unit 30 returns the process to Step S102.

At Step S203, the control unit 30 makes the left hand 31 grip the gripped pieces P at the positions of the second to fifth bits 72 to 75, and determines whether the gripping result of each of the first to fifth bits 71 to 75 is "1" or not "0" similarly to Step S202.

Next, the control unit 30 determines the type of the workpiece on the basis of the gripping results of the first to fifth bits 71 to 75 and the determination table 39 (see FIGS. 4 and 6) (Step S204), and then returns the process to Step S102.

As described above, the automatic working device 1 according to the embodiment performs a simulation operation for gripping the gripped piece P provided at the predetermined position 7 of the supply vessel by using the left hand 31 and determines the type of the workpiece whether the gripped piece P can be gripped before the work operation is started.

As a result, the automatic working device 1 according to the embodiment can determine the type of the workpiece by using an existing sensor that determines whether the workpiece can be gripped without providing a dedicated sensor for determining the type of the workpiece. Therefore, according to the automatic working device 1 according to the embodiment, the cost of the automatic working device 1 can be suppressed.

Moreover, it has been explained in the embodiment that the left hand 31 includes the gripper 33 that grips a workpiece by sandwiching the workpiece therebetween. However, the left hand 31 may include an adsorption unit that grips a workpiece by adsorbing the workpiece in place of the gripper 33.

Figure 12:
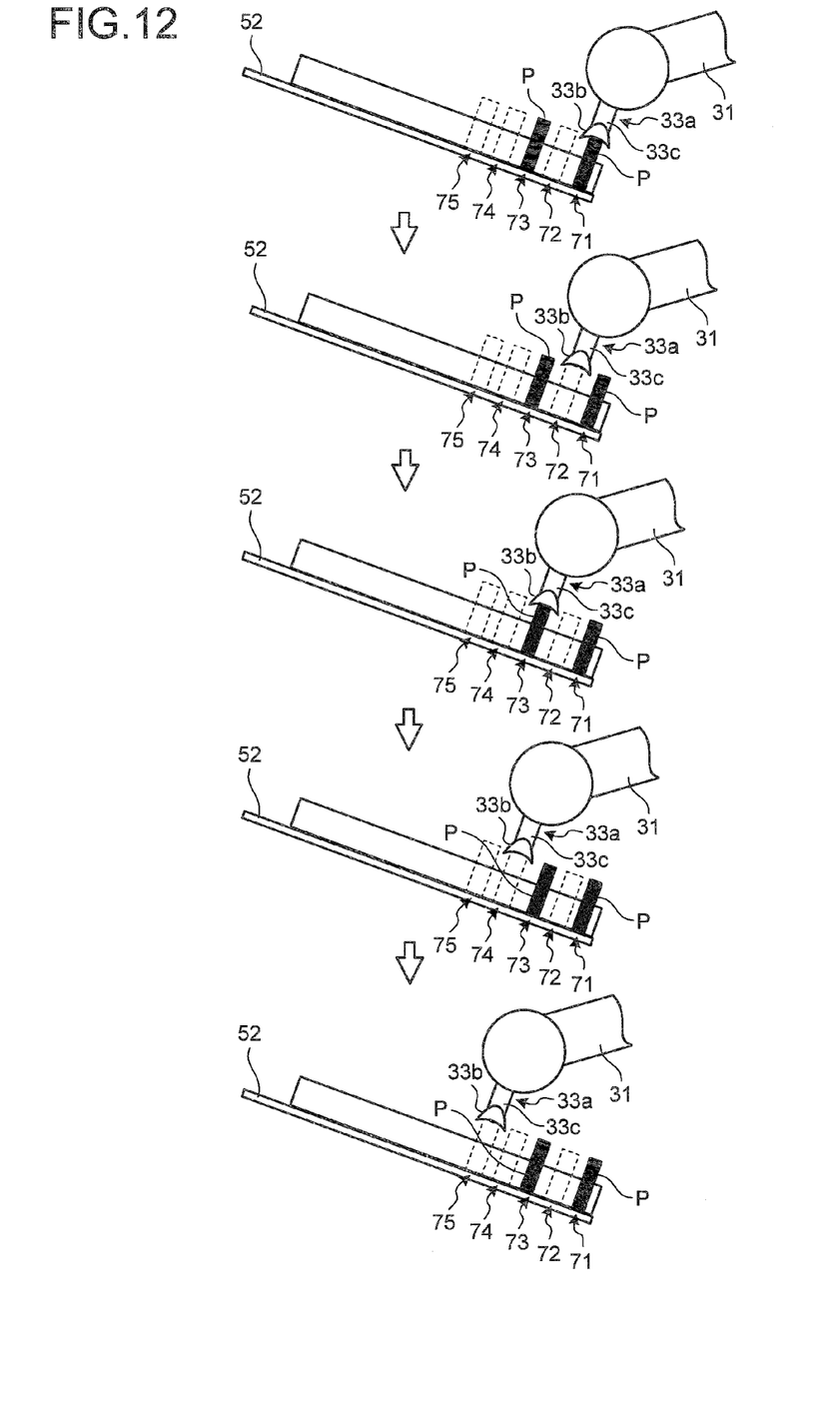
FIG. 12 is a diagram illustrating an example of a workpiece type determination operation that is performed by a left hand including an adsorption unit according to the embodiment.

Herein, an example of a workpiece type determination operation performed by the left hand 31 including an adsorption unit 33a will be explained with reference to FIG. 12. FIG. 12 is a diagram illustrating an example of a workpiece type determination operation that is performed by the left hand 31 including the adsorption unit 33a according to the embodiment.

As illustrated in FIG. 12, the left hand 31 includes the adsorption unit 33a. The adsorption unit 33a includes, for example, a sucker 33b that grips a workpiece and an air cylinder 33c that sucks in air from an adsorbing surface of the sucker 33b. Moreover, the adsorption unit 33a includes a sensor (not illustrated) that determines whether the workpiece is gripped on the basis of a load on the air cylinder 33c when air is sucked in.

Then, as illustrated in FIG. 12, when the type of the workpiece is determined by the left hand 31, the sucker 33b comes into contact with the leading end of the gripped piece P and air is sucked in by the air cylinder 33c in order of the first to fifth bits 71 to 75.

At this time, the bit at which the gripped piece P exists has the larger load on the air cylinder 33c during sucking air than the bit at which the gripped piece P does not exist. As a result, the left hand 31 including the adsorption unit 33a can determine whether the gripped piece P exists or not by using a sensor that determines whether the workpiece is gripped on the basis of the load on the air cylinder 33c.

Therefore, the left hand 31 including the adsorption unit 33a can determine the type of the workpiece by checking the determination result on the presence or absence of the gripped piece P determined by the sensor with the determination table 39 illustrated in FIG. 6.

Moreover, it has been explained in the present embodiment that the gripped pieces P are provided in all the first bits 71 of the supply vessels in order to perform an operation check on the left hand 31 by using the first operation when the type of a workpiece is determined. However, the first bit 71 may be used to determine the type of the workpiece.

In this case, because all the first to fifth bits 71 to 75 can be used to determine the type of a workpiece, the number of types of workpieces that can be indicated by combinations of arrangement positions of the gripped pieces P can be maximized.

Moreover, it has been explained in the present embodiment that the supply place of a target workpiece is designated from the display operating unit 4 to the control unit 30. However, the automatic working device 1 may be constituted in such a manner that only the type of a workpiece is designated by the display operating unit 4.

In this case, the automatic working device 1 changes the working program 38 so as to make the left hand 31 perform a simulation operation for gripping the gripped piece P on all the supply vessels before the work operation is started and to search for the target workpiece.

According to this configuration, even if a user of the automatic working device 1 provides a supply vessel at a place different from a predetermined place of the working booth 2 by mistake, for example, the automatic working device 1 can automatically search for the supply vessel of the workpiece used for a work operation to perform the work operation. Therefore, even if an artificial error occurs with respect to the installation location of a supply vessel, the automatic working device 1 can appropriately perform a work operation by using a workpiece to be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An automatic working device comprising:
a robot hand that grips a target workpiece of workpieces;
a piece that indicates types of the workpieces;
supply vessels each of which supplies the corresponding workpiece to the robot hand and has a predetermined place at which the piece is provided;
a control unit configured to control a gripping operation of the robot hand; and
a first sensing unit configured to detect a gripping result on the basis of whether the piece is gripped by the robot hand,
wherein the control unit comprises a determining unit that determines the type of the workpiece on the basis of the gripping result detected by the first sensing unit.

2. The automatic working device according to claim 1, wherein
each of the supply vessels further has one or more places at which the piece is provided,
the automatic working device further comprises a second sensing unit configured to detect a gripping position at which the piece is gripped by the robot hand, and
the determining unit determines the type of the workpiece on the basis of the gripping position and the gripping result of the piece.

3. The automatic working device according to claims 2, wherein the robot hand grips the workpiece by sandwiching the workpiece therebetween.

4. The automatic working device according to claims 2, wherein the robot hand grips the workpiece by adsorbing the workpiece.

5. The automatic working device according to claims 2, wherein
the supply vessel is held to be downward inclined from a predetermined wall surface of a working booth on which a work operation is performed by the robot hand toward a working area of the robot hand, and
the workpiece of the supply vessel moves in the supply vessel toward the robot hand due to its own weight whenever the workpiece is taken out from the supply vessel by the robot hand.

6. The automatic working device according to claim 1, wherein
the automatic working device further comprises one or more pieces that are provided in each of the supply vessels and whose combination of arrangement positions is different in accordance with the types of the workpieces, and
the determining unit determines the type of the workpiece on the basis of a combination of gripping positions and gripping results of the pieces.

7. The automatic working device according to claims 6, wherein the robot hand grips the workpiece by sandwiching the workpiece therebetween.

8. The automatic working device according to claims 6, wherein the robot hand grips the workpiece by adsorbing the workpiece.

9. The automatic working device according to claims 6, wherein
the supply vessel is held to be downward inclined from a predetermined wall surface of a working booth on which a work operation is performed by the robot hand toward a working area of the robot hand, and the workpiece of the supply vessel moves in the supply vessel toward the robot hand due to its own weight whenever the workpiece is taken out from the supply vessel by the robot hand.

10. The automatic working device according to claim 2, wherein
the automatic working device further comprises one or more pieces that are provided in each of the supply vessels and whose combination of arrangement positions is different in accordance with the types of the workpieces, and
the determining unit determines the type of the workpiece on the basis of a combination of gripping positions and gripping results of the pieces.

11. The automatic working device according to claims 10, wherein
the supply vessel is held to be downward inclined from a predetermined wall surface of a working booth on which a work operation is performed by the robot hand toward a working area of the robot hand, and
the workpiece of the supply vessel moves in the supply vessel toward the robot hand due to its own weight whenever the workpiece is taken out from the supply vessel by the robot hand.

12. The automatic working device according to claim 10, further comprising a storage unit that stores therein a determination table that associates the types of the workpieces with a combination of presence or absence of the pieces.

13. The automatic working device according to claims 1, wherein the robot hand grips the workpiece by sandwiching the workpiece therebetween.

14. The automatic working device according to claims 13, wherein
the supply vessel is held to be downward inclined from a predetermined wall surface of a working booth on which a work operation is performed by the robot hand toward a working area of the robot hand, and
the workpiece of the supply vessel moves in the supply vessel toward the robot hand due to its own weight whenever the workpiece is taken out from the supply vessel by the robot hand.

15. The automatic working device according to claims 1, wherein the robot hand grips the workpiece by adsorbing the workpiece.

16. The automatic working device according to claims 1, wherein
the supply vessel is held to be downward inclined from a predetermined wall surface of a working booth on which a work operation is performed by the robot hand toward a working area of the robot hand, and
the workpiece of the supply vessel moves in the supply vessel toward the robot hand due to its own weight whenever the workpiece is taken out from the supply vessel by the robot hand.

17. The automatic working device according to claim 16, further comprising a taking-out path that is provided to be downward inclined from the working area toward the predetermined wall surface and takes out a vessel for work completion into which the workpiece after work completion is taken by the robot hand to an outside of the working booth, wherein
the vessel for work completion moves along the taking-out path toward the predetermined wall surface due to its own weight when a pressing force is added by the robot hand toward the predetermined wall surface.

18. The automatic working device according to claim 17, wherein
the vessel for work completion includes a finished product vessel into which a non-defective product is taken and a defective product vessel into which a defective product is taken among the workpieces after work completion, and
the robot hand throws a distinction member that distinguishes the finished product vessel from the defective product vessel into the finished product vessel or the defective product vessel before the work operation is started.

19. The automatic working device according to claim 1, further comprising a storage unit that stores therein a determination table that associates the types of the workpieces with a combination of presence or absence of the piece.

20. An automatic working device comprising:
a gripping means for gripping a target workpiece of workpieces;
an indicating means for indicating types of the workpieces;
supply means for supplying the corresponding workpiece to the gripping means, the supplying means having a predetermined place at which the indicating means is provided;
a controlling means for controlling a gripping operation of the gripping means; and
a sensing means for detecting a gripping result on the basis of whether the indicating means is gripped by the gripping means,
wherein the controlling means comprises a determining means for determining the type of the workpiece on the basis of the gripping result detected by the sensing means.

* * * * *